US012010209B2

(12) United States Patent
Winblad et al.

(10) Patent No.: US 12,010,209 B2
(45) Date of Patent: Jun. 11, 2024

(54) MEMORY-EFFICIENT HARDWARE CRYPTOGRAPHIC ENGINE

(71) Applicant: Nordic Semiconductor ASA, Trondheim (NO)

(72) Inventors: Marko Winblad, Trondheim (NO); Markku Vähätaini, Trondheim (NO); James Nevala, Trondheim (NO); Matti Tiikkainen, Trondheim (NO); Hannu Talvitie, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 686 days.

(21) Appl. No.: 17/059,393

(22) PCT Filed: May 29, 2019

(86) PCT No.: PCT/EP2019/064108
§ 371 (c)(1),
(2) Date: Nov. 27, 2020

(87) PCT Pub. No.: WO2019/229192
PCT Pub. Date: Dec. 5, 2019

(65) Prior Publication Data
US 2021/0216665 A1    Jul. 15, 2021

(30) Foreign Application Priority Data

May 30, 2018  (GB) ...................................... 1808834

(51) Int. Cl.
*H04L 9/06*      (2006.01)
*G06F 13/28*    (2006.01)
*G06F 21/72*    (2013.01)

(52) U.S. Cl.
CPC ................ *H04L 9/06* (2013.01); *G06F 13/28* (2013.01); *G06F 21/72* (2013.01); *H04L 2209/12* (2013.01)

(58) Field of Classification Search
CPC ........ H04L 9/06; H04L 2209/12; G06F 21/72
See application file for complete search history.

(56) References Cited

U.S. PATENT DOCUMENTS

| 7,266,703 B2* | 9/2007 | Anand ................. H04L 9/0643 |
| | | 713/168 |
| 8,918,650 B2* | 12/2014 | Dolgunov ............. G06F 21/602 |
| | | 380/37 |

(Continued)

FOREIGN PATENT DOCUMENTS

EP    1 191 736 A2    3/2002

OTHER PUBLICATIONS

IPO Search Report under Section 17(5) for GB1808834.4, dated Nov. 9, 2018, 4 pages.

(Continued)

*Primary Examiner* — Zachary A. Davis
(74) *Attorney, Agent, or Firm* — Klarquist Sparkman, LLP

(57) ABSTRACT

A hardware cryptographic engine comprises a direct-memory-access (DMA) input module for receiving input data over a memory bus, and a cryptographic module. The cryptographic module comprises an input register having an input-register length, and circuitry configured to perform a cryptographic operation on data in the input register. The hardware cryptographic engine further comprises an input-alignment buffer having a length that is less than twice said input-register length, and alignment circuitry performing an alignment operation on input data in the input-alignment buffer. The hardware cryptographic engine is configured to pass input data, received by the DMA input module, from (Continued)

the memory bus to the input register of the cryptographic module after buffering an amount of input data no greater than the length of the input-alignment buffer.

19 Claims, 3 Drawing Sheets

(56) References Cited

U.S. PATENT DOCUMENTS

| | | |
|---|---|---|
| 2004/0146158 A1 | 7/2004 | Park |
| 2004/0148512 A1 | 7/2004 | Park et al. |
| 2005/0147239 A1 | 7/2005 | Chin et al. |
| 2005/0213766 A1 | 9/2005 | Goss |
| 2007/0195957 A1* | 8/2007 | Arulambalam ....... H04L 9/0894 380/277 |
| 2010/0128874 A1 | 5/2010 | Scott-Nash |
| 2012/0011351 A1* | 1/2012 | Mundra ................ H04L 9/3242 713/192 |

OTHER PUBLICATIONS

International Search Report and Written Opinion for PCT/EP2019/064108, dated Jul. 11, 2019, 17 pages.
/ Anonymous: "HS Endpoint Processor with USB 2.0, Smart Card, & FMC for Secure Token & Storage", Jul. 3, 2013 (Jul. 3, 2013), XP055116559, Retrieved from the Internet: URL:http://ww1.microchip.com/downloads/en/DeviceDoc/sec2410_4410.pdf [retrieved on May 6, 2014] Sections 14.1.; 14.3; 16.1.7.
STM32F7—Cryptographic processor (CRYP), Sep. 26, 2016, 15 pages.
STM32F7—DMA, Sep. 26, 2016, 12 pages.
Office Action issued in corresponding Chinese Application No. 201980049863.9 (with English translation), dated Jun. 7, 2023, 14 pages.

* cited by examiner

MEMORY-EFFICIENT HARDWARE CRYPTOGRAPHIC ENGINE

CROSS REFERENCE TO RELATED APPLICATIONS

This is the U.S. National Stage of International Application No. PCT/EP2019/064108, filed May 29, 2019, which was published in English under PCT Article 21(2), which in turn claims the benefit of Great Britain Application No. 1808834.4, filed May 30, 2018.

BACKGROUND OF THE INVENTION

The present invention relates to a hardware cryptographic engine.

Communication and storage systems commonly encrypt data in order to prevent unauthorised third parties from being able to access the unencrypted data. A cipher is an algorithm that manipulates a "plaintext" message in order to produce an encrypted "ciphertext" message that is unintelligible to unauthorised third parties but that can be converted back to the plaintext data by authorised users. This is typically achieved through use of a secret key that is known only to authorised participants. In a symmetric cipher, the same key is used for encryption and decryption, while asymmetric ciphers use a public key for encryption and an associated private key for decryption. A large number of cipher algorithms and associated encryption schemes are known in the art. As well as encryption and decryption operations, cipher algorithms may also be used within other cryptographic operations, such as message authentication code (MAC) generation.

Two common types of cipher algorithm are block ciphers and stream ciphers. Both are typically associated with symmetric key-based encryption schemes. A block cipher is a deterministic algorithm that operates on fixed-size blocks of plaintext data in sequence, in order to produce a corresponding sequence of fixed-size ciphertext blocks. Stream ciphers, by contrast, encrypt input data one bit at a time—e.g., by calculating a bitwise-XOR between the input data and a key-stream of bits that is derived from the secret key by a deterministic algorithm.

Most block ciphers, such as the Advanced Encryption Standard (AES), can be used in various different modes of operation. The simplest mode is the Electronic Codebook (ECB) mode, in which each block of plaintext data in a sequence of plaintext blocks is encrypted independently of every other block in the sequence. This is illustrated in FIG. 1, which shows an ECB encryption operation. Decryption, similarly, is performed independently for each block.

In other modes of operation, the position a block of plaintext data in a sequence of plaintext blocks (relative to an initial block) affects the value of the ciphertext block generated from that plaintext block. This means that two identical plaintext books will not typically be encrypted to the same ciphertext block. This can increase security. These other modes may use an initialise vector (IV) to obscure the output of the first ciphertext block. FIG. 2 illustrates encryption using a Cipher Block Chaining (CBC) mode.

FIG. 3 illustrates encryption using a stream cipher, such as SNOW 3G. Key data is generated as an on-going sequence of bits, derived from a cryptographic key and an initialisation vector. For implementation purposes, this key stream may be generated in multi-bit blocks (e.g., as a sequence of 32-bit blocks, in SNOW 3G). The key-stream data is then bitwise XOR'd with incoming plaintext data to generate ciphertext output data. FIG. 3 illustrates an implementation that requires a multi-bit block of input data on which to perform the cipher operation. However, alternative implementations may operate on individual bits at a time.

It is known to implement cryptographic operations in software executing on a general-purpose processor, or using a hardware cryptographic engine having dedicated electronic logic for performing the cryptographic operation (e.g., a cipher). Such dedicated hardware implementations are sometimes also referred to as cryptographic accelerators, cryptographic coprocessors, or cryptoprocessors. Hardware cryptographic engines can typically process large amounts of data very quickly and consume less power than software. They can allow a general-purpose processor on the same device as the hardware cryptographic engine to enter a sleep state, or to perform other tasks, while the cryptographic engine runs.

A hardware cryptographic engine may be implemented as a standalone component (e.g., a dedicated integrated-circuit package), or it may be integrated with other components on a system-on-chip (SoC) device.

Certain known hardware cryptographic engines, such as the STM32F7 Cryptographic Processor (CRYP) from STMicroelectronics™, can receive input data over a memory bus using direct memory access (DMA), and can output encrypted ciphertext, or decrypted plaintext, over the same memory bus. This can enable further power savings, by allowing the processor to enter a sleep state while the cryptographic engine fetches input data from RAM, processes the data, and outputs the processed results data to RAM. However, known implementations are typically complex and occupy a relative large area on an integrated circuit.

The present invention seeks to provide a simpler hardware cryptographic engine.

SUMMARY OF THE INVENTION

From a first aspect, the invention provides a hardware cryptographic engine comprising:
 a direct-memory-access (DMA) input module for receiving input data over a memory bus; and
 a cryptographic module,
wherein the cryptographic module comprises:
 an input register having an input-register length; and
 circuitry configured to perform a cryptographic operation on data in the input register,
wherein the hardware cryptographic engine further comprises an input-alignment buffer having a length that is less than twice said input-register length, and alignment circuitry for performing an alignment operation on input data in the input-alignment buffer, and
wherein the hardware cryptographic engine is configured to pass input data, received by the DMA input module, from the memory bus to the input register of the cryptographic module after buffering an amount of input data no greater than the length of the input-alignment buffer.

From a second aspect, the invention provides an electronic apparatus comprising such a hardware cryptographic engine.

From a third aspect, the invention provides a method of performing a cryptographic operation on data, the method comprising:
 receiving input data by direct memory access (DMA) over a memory bus; and
 performing a cryptographic operation on the received input data using a hardware cryptographic module that comprises an input register having an input-register length and circuitry configured to perform the cryptographic operation on data in the input register,
wherein the method comprises:
buffering the input data, received over the memory bus, in an input-alignment buffer having a length that is less than twice said input-register length; and
passing the input data to the input register of the cryptographic module after buffering an amount of the input data no greater than the length of the input-alignment buffer.

Thus it will be seen that, in accordance with the invention, the hardware cryptographic engine buffers the input data for alignment purposes, but only in a buffer that is less than twice the minimum-sized unit of input required by the cryptographic operation.

Such a cryptographic engine can be produced at lower cost than prior-art designs, such as the STM32F7 Cryptographic Processor from STMicroelectronics™, because it requires less memory and so occupies less space.

The STM32F7 Cryptographic Processor, for example, has an input buffer of size 8×32 bits=256 bits which receives data from a DMA controller. The Cryptographic Processor implements DES, Triple-DES and AES. The DES and Triple-DES ciphers operate on blocks of input data that are 64 bits long, while the AES cipher operates on 128-bit blocks.

The present inventors have realised, however, that it is possible to produce a hardware cryptographic engine that performs no input buffering before the input register, other than for input alignment to ensure correct alignment of the input data.

The hardware cryptographic engine may, in some embodiments, use memory-address information to select an input-register-length block of data from the input-alignment buffer, and to transfer the selected block of data to the input register.

In some embodiments, the input-alignment buffer may have a length that is equal to twice said input-register length, minus one byte. The input-alignment buffer may have a length that is the smallest length that ensures it is always possible to align any input data received by the DMA input module, from the memory bus, to the boundaries of the input register (e.g., with 32-bit alignment, if the input register is 32 bits long), even when the input data is only aligned to byte-sized address boundaries.

For example, in one embodiment, the cryptographic operation is SNOW 3G, which operates on 32-bit words; the input-register length is 32 bits; and the hardware engine comprises a 56-bit input-alignment buffer on the input side. It may also comprise a 32-bit output buffer and a 56-bit output-alignment buffer before a DMA output module.

The input register may be entirely internal to the cryptographic engine—e.g., not addressable and/or readable and/or writeable from outside the cryptographic engine. The circuitry in the cryptographic module may comprise a set of one or more wires, each wire having a first end that is connected to a respective bit position of the input register, and a second end that is connected to a respective electronic operator. There may be as many wires as there are bits in the input register. It will be understood that, be these means, the cryptographic engine may operate directly on the data in the input register. Each electronic operator may implement an operation that is part of the cryptographic operation. Each electronic operator may implement a logical operation, a mathematical operation, a substitution operation, a bit-scrambling operation, a cyclic-permutation operation, an expansion operation, or a compression operation. It may be a logic gate (e.g., an XOR gate), an arithmetic unit, or a lookup table. The number of electronic operators may be smaller, or larger, or equal to the bit-length of the input-register. One electronic operator may receive inputs from two or more bit positions. Conversely, one bit position may input to two or more electronic operators.

The input register may be a shift-register or first-in first-out (FIFO) buffer. It may store byte-sized unit (i.e., 8 bits). In some embodiments, the cryptographic module circuitry may change one or more bit values in the input register as the cryptographic operation is performed. The input register may also serve as an output register, and may contain the result of the cryptographic operation after the cryptographic operation has been applied to the data in the input register. In other embodiments, the contents of the input register may be unchanged by the circuitry performing the cryptographic operation; the cryptographic module may comprise a separate output register for storing output data representing the result of the cryptographic operation. The output register may be the same length as the input register. The output register may be entirely internal to the cryptographic engine—e.g., not addressable and/or readable and/or writeable from outside the cryptographic engine. The circuitry in the cryptographic module may comprise a set of one or more wires, each wire having a first end that is connected to a respective bit position of the output register, and a second end that is connected to an output of a respective electronic operator. There may be as many wires as there are bits in the output register. It will be understood that, be these means, the cryptographic engine may output calculation results directly to the output register.

The cryptographic operation may be a cipher operation, such as an encryption and/or decryption algorithm. It may be a standard cipher operation such as SNOW 3G, AES, DES, 3-DES, KASUMI, or any other stream cipher or block cipher known today or developed in future. The cryptographic module may be a cipher module. The cryptographic module may implement ECB mode or CBC mode or any other mode of operation. While the cryptographic module may, in some embodiments, perform a more complex operation, such as generating a message authentication code using a cipher operation as a cryptographic primitive, in other embodiments the cryptographic module performs only one or more primitive cipher operations. The cryptographic module may support just one cryptographic operation, such as one cipher operation (although this may include encryption and decryption modes of the cipher operation).

The input-register length may be one bit, 32 bits, 64 bits, 128 bits, 256 bits, or any other appropriate length. The input-register length may be variable (e.g., dependent on a stored configuration parameter) but is preferably fixed. The input-register length may be equal to a block length of the cryptographic operation. The hardware cryptographic module may require a minimum-sized unit of input data, equal to the input-register length, in order to perform the cryptographic operation (i.e., to perform the cryptographic operation correctly so as to generate the correct output).

For a stream cipher, the input register may be a single bit, but it may be a longer block length—e.g., for SNOW 3G the input register may be 32 bits long and the circuitry may be configured to perform an XOR operation between the data in the input register and a 32-bit keystream block generated by the cryptographic module. In this example, each one-bit memory cell of the input register may be connected directly to an input of a respective XOR gate, from a set of thirty-two XOR gates.

The cryptographic module may comprise a key input for receiving a cryptographic key; it may comprise an initialisation-vector input for receiving an initialisation vector (IV). The DMA input module may be configured to receive (i.e., fetch) a cryptographic key and/or an IV—e.g., over the memory bus or over a separate key bus. The cryptographic module may thereby be able to perform a plurality of instances of the cryptographic operation (e.g., two or more stream-cipher operations) in a single chained DMA transfer. This can be beneficial in further reducing load on the processor. Also, by receiving a key and/or IV by DMA, the cryptographic module can ensure that any key data and IV data required for the cryptographic operation is in place before receiving and processing the input data; this can help to avoid any synchronisation issues that might otherwise occur e.g., if the key data and IV data were instead written to input registers by a processor, which might otherwise need to be mitigated by buffering the input data.

The hardware cryptographic engine may comprise a direct-memory-access (DMA) output module for sending output data over a memory bus, which may be the aforesaid memory bus or a different memory bus. The cryptographic module may comprise an output register (which could be the input register, or a separate register). The hardware cryptographic engine may be configured to pass output data from the output register, through the DMA output module, to the memory bus without buffering the output data, or after buffering an amount of output data no greater than the output-register length, or twice said output-register length. In some embodiments, the hardware cryptographic engine may have a minimal output buffer—e.g., an output-alignment buffer to perform word alignment before sending the output data over a memory bus—but, at least in some embodiments, this output buffer may be no greater than twice the length of the output register. In other embodiments, however, there may be a larger output buffer, which is not necessarily used only for data alignment, but e.g. to address timing issues. The DMA input module and DMA output module may be configured so that the incoming input data is stalled when there is data in the output register.

In some embodiments, the input-alignment buffer and/or output buffer may be within the cryptographic module.

The cryptographic module may contain no random-access memory (RAM) for storing or buffering intermediate results. It may be configured not to store any intermediate result that it is not necessary to store in order to implement the cryptographic operation. Instead, the cryptographic module may be configured to perform the cryptographic operation by storing only current operands of steps in the cryptographic operation in internal registers of the cryptographic-module circuitry.

In some embodiments, it may be necessary to buffer a predetermined number of bytes in order to implement a chained cipher mode within the cryptographic module—e.g., when performing an AES-CBC encryption. In such cases, the cryptographic engine may comprise a work buffer sized to store the predetermined number of bytes. The work buffer may be no larger than required to perform the chaining. The work buffer may be separate from an output buffer or the output register, or these may be the same or may overlap.

The DMA input module and the cryptographic module may be integrated on an integrated circuit—e.g., on a silicon chip. The hardware cryptographic engine may form part of a larger electronic apparatus, as disclosed above.

An electronic apparatus comprising the hardware cryptographic engine may be an integrated-circuit device, such as a system-on-chip (SoC) or a radio-on-chip. The electronic apparatus may comprise said memory bus. It may comprise a memory. The electronic apparatus may be configured to use the hardware cryptographic engine to encrypt data for communication over a wireless or wired communication link, such as over a radio channel, or to decrypt data received over such a communication link—e.g., an LTE Cat-M1 (LTE-M) or NB-IoT cellular radio link. Some embodiments may be well suited for use encrypting or decrypting data communications for a cellular radio channel, especially non-voice communications such as machine-to-machine or Internet-of-Things communications; this is because the relatively low bandwidth requirement of such radio communications may mean that the cryptographic engine is unlikely to experience any performance or timing problems, despite the minimal input buffering of the hardware cryptographic engine.

The electronic apparatus may comprise one or more processors, such as an Arm™ Cortex™-M processor. The memory bus may comply with Arm's™ Advanced Microcontroller Bus Architecture (AMBA); it may be or may comprise an Advanced High-Performance (AHP) bus and/or an Advanced Peripheral Buses (APB). The hardware cryptographic engine may be a bus master on the memory bus. The electronic apparatus may have a separate DMA controller to which the DMA input module is coupled, but this is not essential; in some embodiments, the DMA input module is connected directly the memory bus and can directly read data from a memory of the apparatus—e.g., from an SRAM or Flash memory region. Similarly, the DMA output module may be able to write data directly to a memory of the apparatus.

The hardware cryptographic engine may comprise a register interface for receiving an instruction—e.g., from a processor. The cryptographic engine may comprise an input for receiving a memory address. The DMA input module may be configured to use the received memory address to fetch the input data from the received memory address. The cryptographic engine may also comprise an input for receiving a data length value, and may be configured to read the indicated length of input data from the memory address. The cryptographic engine may comprise an input for receiving an output memory address and the DMA output module may be configured to write output data from the cryptographic module to the received output memory address.

Providing the cryptographic engine with DMA input and/or output capabilities, as described, can help avoid input-buffer underflow or output-buffer overflow, which might otherwise occur if the cryptographic engine had to signal to a separate DMA controller, and rely on its timely response, to receive input data or to output processed data.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
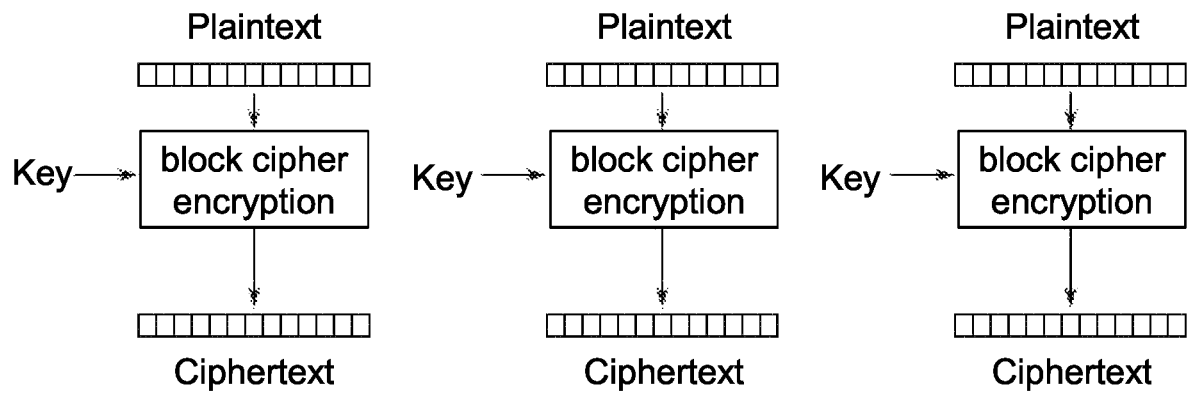
FIG. 1 is a schematic diagram of ECB mode encryption.
Figure 2:
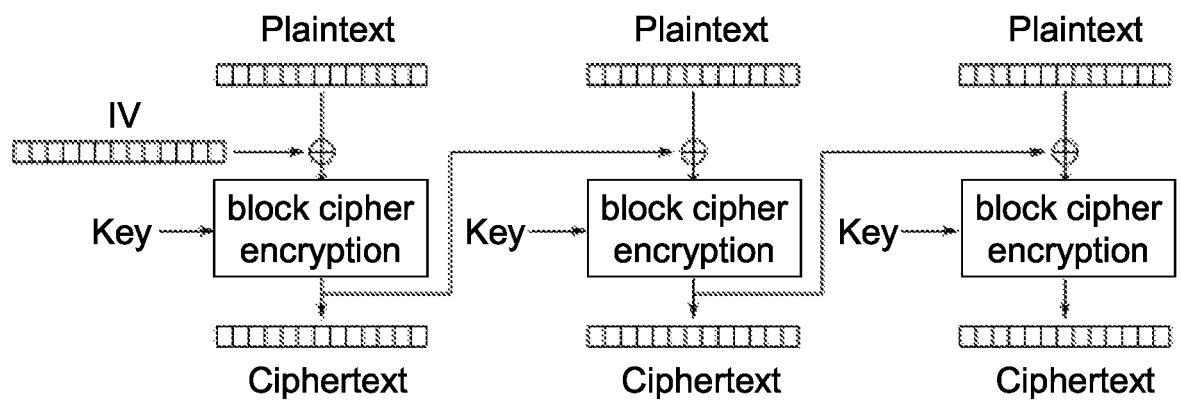
FIG. 2 is a schematic diagram of CBC mode encryption.
Figure 3:
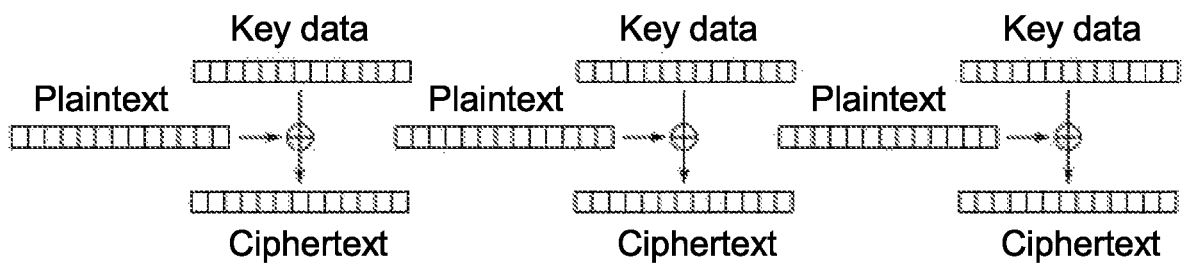
FIG. 3 is a schematic diagram of stream-cipher encryption.
Figure 4:
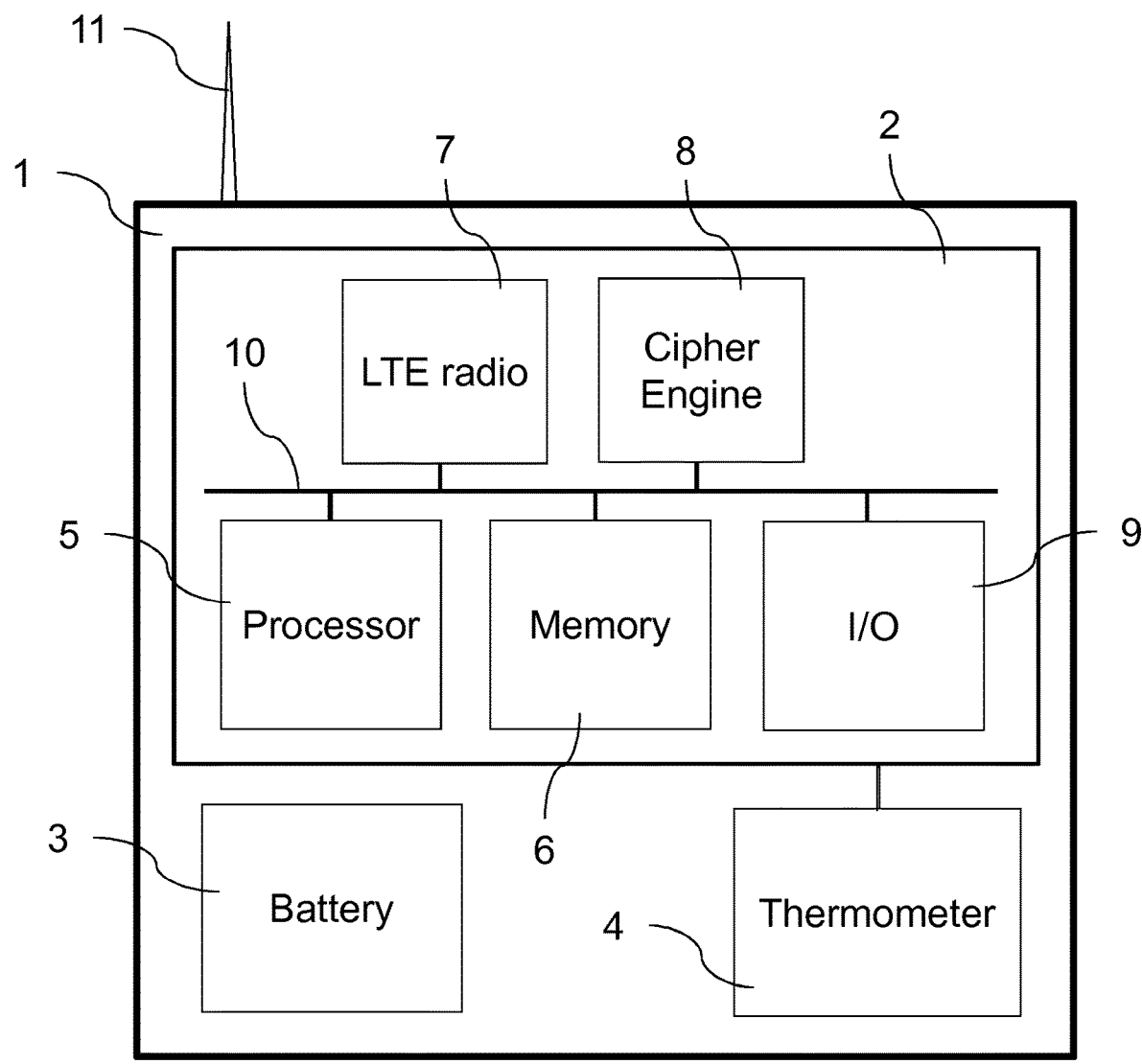
FIG. 4 is a schematic diagram of a wireless temperature sensor having a cipher engine embodying the invention.

FIG. 4 shows a wireless temperature sensor 1 which contains an integrated radio chip 2, a battery 3 and a thermometer 4. The temperature sensor 1 also contains other components, such as PCBs, oscillators, capacitors, resistors, etc. which are omitted here for simplicity. The radio chip 2 includes a processor 5, memory 6 (which may include volatile and non-volatile memory types), an LTE Cat-M1 (LTE-M) radio 7, a hardware SNOW-3G cipher engine 8 (embodying a hardware cryptographic engine as disclosed above), and an input/output peripheral 9, such as a USB interface. It may, of course, have other integrated peripherals and components. The processor 5, memory 6 and peripherals 7, 8, 9 are connected to a memory bus 10. The memory bus 10 may be an Arm™ AMBA bus system, including one or more Advanced High-Performance Buses (AHB) and Advanced Peripheral Buses (APB). The memory bus 10 supports direct memory access (DMA) to the memory 6. The temperature sensor 1 also has an antenna 11 which is connected to the LTE-M radio 7 via appropriate off-chip components.

The memory 6 stores software which is executed by the processor 5 for controlling the operation of the temperature sensor 1. In use, the processor 5 uses the I/O peripheral 9 to fetch temperature readings from the thermometer 4 at intervals, and writes these to the memory 6. The wireless temperature sensor 1 periodically transmits a log of temperature information, collected over a period of time, to a network base station (not shown) using the LTE-M radio 7. The log data in each frame is encrypted, using the SNOW 3G stream cipher, for privacy reasons.

The encryption is achieved by the processor 5 placing the temperature log data for encryption at a particular address in memory 6 (e.g., in RAM), and instructing the SNOW-3G cipher engine 8 to encrypt the data. The processor 5 may provide the particular address and the length of data to the SNOW-3G cipher engine 8 (e.g., by writing the address and a length value to a register interface of the cipher engine 8). The SNOW-3G cipher engine 8 accesses a 128-bit key and a 128-bit initialisation vector from predetermined addresses in the memory 6 (or from register inputs), then begins reading the plaintext data sequentially from the memory 6 in 32-bit blocks, acting as a bus master on at least part of the memory bus 10.

The SNOW-3G cipher engine 8 generates a sequence of 32-bit keystream blocks, according to the SNOW 3G specification. In each encryption-block cycle, the cipher engine 8 reads one 32-bit block of plaintext data, performs a bitwise XOR between the plaintext data block and a corresponding keystream block, and writes the resulting 32-bit ciphertext block to another address in memory 6 (e.g., in RAM), over the memory bus 10. At the appropriate time, the encrypted temperature log data is read from the memory 6 and transmitted in packets by the LTE-M radio 7 to the network base station.

Figure 5:
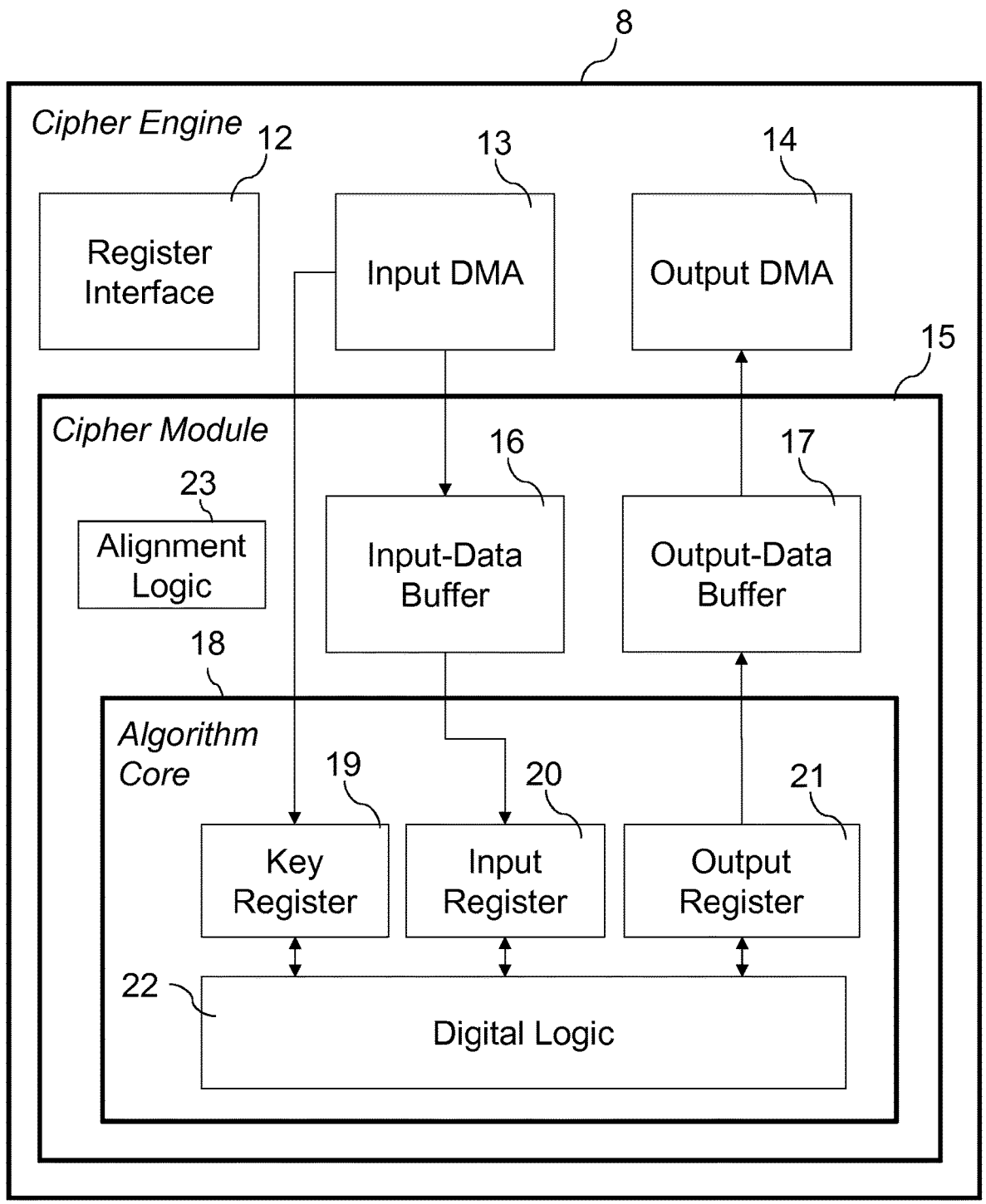
FIG. 5 is a schematic diagram showing the cipher engine in more detail.

FIG. 5 provides more details of the SNOW-3G cipher engine 8.

The SNOW-3G cipher engine 8 interfaces with the rest of the device by means of a register interface 12, an input DMA module 13 and an output DMA module 14. These are all connected to the memory bus 10. The register interface 12 allows the SNOW-3G cipher engine 8 to receive commands, typically from the processor 5. The input DMA module 13 is a bus master on the bus system 10 and can read data directly from the memory 6. The output DMA module 14 is also a bus master on the bus system 10 and can write data directly to the memory 6. The cipher engine 8 may also have signal-line inputs for receiving signals from other peripherals (e.g., through a programmable peripheral interconnect), and may have event-line output for signalling events to other peripherals and/or interrupt-line outputs for interrupting the processor 5; however, these additional lines are omitted from FIG. 5 for simplicity.

The SNOW-3G cipher engine 8 contains a cipher module 15 for performing the SNOW-3G algorithm. The cipher module 15 in this example includes a 56-bit input-alignment buffer 16 and a 56-bit output-alignment buffer 17, as well as associated alignment logic circuitry 23.

The cipher module 15 also includes circuitry that forms the SNOW-3G algorithm core 18. The algorithm core 18 includes a key register 19 for receiving a cryptographic key from the input DMA module 13; a 32-bit input register 20 for receiving input data (e.g., plaintext) from the input-alignment buffer 16; and a 32-bit output register 21 for providing output data (e.g., ciphertext) from the algorithm core 18 to the output-alignment buffer 17. The input-alignment buffer 16, input register 20, key register 19, output register 21 and output-alignment buffer 17 may be implemented as byte-level FIFOs or in any other appropriate way. In other embodiments, there may be no output-alignment buffer 17. The key register 19, input register 20 and output register 21 are not readable from outside the algorithm core 18. In addition to these internal registers, the algorithm core 18 contains digital logic 22, wired to the individual bits of the key register 19, input register 20 and output register 21, for performing the cipher operation. There may also be an initialisation-vector register (not shown).

In use, the processor 5 provides a source memory address, a source data length value, and a destination memory address to the cipher engine 8 through the register interface 12. In some cases, these may be the same memory addresses, or they may define overlapping memory ranges, such that the ciphertext overwrites some or all of the plaintext in the memory 6. The processor 5 also initialises the cipher engine 8 with appropriate key data and any initialisation vector that may be required.

The input DMA module 13 then fetches a 32-bit block of input data from the source address in the memory 6 and passes it to the cipher module 15. If necessary, the alignment logic 23 of the cipher module 15 uses the 32-bit input-alignment buffer 16 to align the incoming non-32-bit-aligned data to the 32-bit block boundary, and then passes the input data to the input register 20 of the algorithm core 18.

The digital logic 22 takes bits from the key register 19 (and optionally an initialisation-vector register) and uses them to generate a 32-bit keystream block, according to the SNOW 3G specification. It then applies the thirty-two bits of the input register 20 and the thirty-two bits of the keystream block as input to thirty-two respective XOR gates. Inputs to the XOR gates are wired directly to the cells of the input register 20. Each XOR gate outputs an output bit to the corresponding bit position in the output register 21. Outputs of the XOR gates may be wired directly to the cells of the output register 21.

Each cycles, the 32-bit contents of the output register 21 are passed to the 56-bit output-alignment buffer 17. The output DMA module 14 reads the output data from the output-alignment buffer 17 and sends it to the destination address in the memory 6 over the memory bus 10. The output-alignment buffer 17 can be used as a flexible storage between the algorithm core 18 and the output DMA module 14 to allow for any appropriate boundary alignment to be performed. In some cases, some output buffering may be provided (e.g., within the output DMA module 14) for purposes other than alignment, in case this is required to avoid output timing issues.

Such an arrangement allows the cipher engine 8 to perform on-the-fly encryption or decryption directly, end-to-end, from source to destination in the memory 6, without any involvement of the processor 5 beyond the initial configuration of the cipher engine 8.

It will be appreciated by those skilled in the art that the invention has been illustrated by describing one or more specific embodiments thereof, but is not limited to these embodiments; many variations and modifications are possible, within the scope of the accompanying claims. For example, the cipher engine may implement any other appropriate cipher algorithm, instead of SNOW 3G.

The invention claimed is:

1. A hardware cryptographic engine comprising:
   a direct-memory-access input module for receiving input data over a memory bus; and
   a cryptographic module,
   wherein the cryptographic module comprises:
      an input register having an input-register length; and
      circuitry configured to perform a cryptographic operation on data in the input register,
   wherein the hardware cryptographic engine further comprises an input-alignment buffer having a length that is less than twice said input-register length, and hardware alignment circuitry for performing an alignment operation on input data in the input-alignment buffer; and
   wherein the hardware cryptographic engine is configured to pass input data, received by the direct-memory-access input module, from the memory bus to the input register of the cryptographic module after buffering an amount of input data no greater than the length of the input-alignment buffer.

2. The hardware cryptographic engine of claim 1, wherein the hardware alignment circuitry is configured to use memory-address information to select a block of data from the input-alignment buffer, the block of data having a length equal to the input-register length, and to transfer the block of data to the input register.

3. The hardware cryptographic engine of claim 1, wherein the input-alignment buffer has a length that is equal to twice said input-register length, minus one byte.

4. The hardware cryptographic engine of claim 1, wherein the input register is not addressable from outside the hardware cryptographic engine.

5. The hardware cryptographic engine of claim 1, wherein the cryptographic-module circuitry comprises a set of one or more wires, each wire having a first end that is connected to a respective bit position of the input register, and a second end that is connected to a respective electronic operator.

6. The hardware cryptographic engine of claim 5, wherein each electronic operator implements a logical operation, a mathematical operation, a substitution operation, a bit-scrambling operation, a cyclic-permutation operation, an expansion operation, or a compression operation, as part of said cryptographic operation.

7. The hardware cryptographic engine of claim 1, wherein the input register is also an output register, and wherein the cryptographic-module circuitry is configured to store a result of the cryptographic operation in the input register.

8. The hardware cryptographic engine of claim 1, wherein the cryptographic module comprises an output register, separate from the input register, for storing output data representing a result of the cryptographic operation.

9. The hardware cryptographic engine of claim 1, wherein the cryptographic module is a cipher module, and wherein the cryptographic operation is SNOW 3G, AES, DES, 3-DES or KASUMI.

10. The hardware cryptographic engine of claim 1, wherein the input-register length is equal to a block length of the cryptographic operation.

11. The hardware cryptographic engine of claim 1, wherein the direct-memory-access input module is configured to fetch a cryptographic key or an initialisation vector as input to the cryptographic module.

12. The hardware cryptographic engine of claim 1, comprising a direct-memory access output module, for sending output data over the memory bus, and an output register of an output-register length, wherein the hardware cryptographic engine is configured to pass output data from the output register, through the direct-memory-access output module, to the memory bus without buffering the output data, or after buffering an amount of output data no greater than twice said output-register length.

13. The hardware cryptographic engine of claim 1, wherein:
   the cryptographic operation is SNOW 3G, which operates on 32-bit words;
   the input-register length is 32 bits; and
   the input-alignment buffer has a length of 56 bits.

14. An electronic apparatus comprising a hardware cryptographic engine and a memory bus, wherein the hardware cryptographic engine comprises:
   a direct-memory-access input module for receiving input data over the memory bus; and
   a cryptographic module,
   wherein the cryptographic module comprises:
      an input register having an input-register length; and
      circuitry configured to perform a cryptographic operation on data in the input register,
   wherein the hardware cryptographic engine further comprises an input-alignment buffer having a length that is less than twice said input-register length, and hardware alignment circuitry for performing an alignment operation on input data in the input-alignment buffer; and
   wherein the hardware cryptographic engine is configured to pass input data, received by the direct-memory-access input module, from the memory bus to the input register of the cryptographic module after buffering an amount of input data no greater than the length of the input-alignment buffer.

15. The electronic apparatus of claim 14, wherein the electronic apparatus is an integrated-circuit device.

16. The electronic apparatus of claim 14, wherein the electronic apparatus is configured to use the hardware cryptographic engine to encrypt data for communication over a radio channel, or to decrypt data received over a radio channel.

17. A method of performing a cryptographic operation on data, the method comprising:
   receiving input data by direct memory access over a memory bus; and
   performing a cryptographic operation on the received input data using a hardware cryptographic module that comprises an input register having an input-register length and circuitry configured to perform the cryptographic operation on data in the input register, wherein the method comprises:

buffering the input data, received over the memory bus, in an input-alignment buffer having a length that is less than twice said input-register length;

performing, by hardware alignment circuitry, an alignment operation on the input data in the input-alignment buffer; and passing the input data to the input register of the cryptographic module after buffering an amount of the input data no greater than the length of the input-alignment buffer.

18. The method of claim 17, wherein the alignment operation comprises using memory-address information to select a block of data from the input-alignment buffer, the block of data having a length equal to the input-register length, and transferring the block of data to the input register.

19. The method of claim 17, wherein the input-alignment buffer has a length that is equal to twice said input-register length, minus one byte.

* * * * *